United States Patent
Johnsson et al.

(10) Patent No.: US 11,736,927 B2
(45) Date of Patent: Aug. 22, 2023

(54) NETWORK ASSISTED DEVICE-TO-DEVICE DISCOVERY FOR PEER-TO-PEER APPLICATIONS

(71) Applicant: Apple Inc., Cupertino, CA (US)

(72) Inventors: Kerstin Johnsson, Palo Alto, CA (US); Alexandre Stojanovski, Paris (FR); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 16/730,262

(22) Filed: Dec. 30, 2019

(65) Prior Publication Data

US 2020/0280835 A1 Sep. 3, 2020

Related U.S. Application Data

(63) Continuation of application No. 14/128,301, filed as application No. PCT/US2013/064865 on Oct. 14, 2013, now Pat. No. 10,531,269.
(Continued)

(51) Int. Cl.
*H04W 8/00* (2009.01)
*H04W 48/06* (2009.01)
(Continued)

(52) U.S. Cl.
CPC ......... *H04W 8/005* (2013.01); *H04W 48/06* (2013.01); *H04W 48/16* (2013.01); *H04W 8/22* (2013.01); *H04W 48/04* (2013.01)

(58) Field of Classification Search
CPC ..... H04W 8/005; H04W 48/06; H04W 48/16; H04W 8/22; H04W 48/04
See application file for complete search history.

(56) References Cited

U.S. PATENT DOCUMENTS 7,613,155 B2 11/2009 Shim
9,320,067 B2 * 4/2016 Ho ..................... H04L 67/1061
(Continued)

FOREIGN PATENT DOCUMENTS

CN   1859799 A   11/2006
CN   1922910 A    2/2007
(Continued)

OTHER PUBLICATIONS

3GPP TR 23.703, "3rd Generation Partnership Project; Technical Specification Group Services and System Aspects; Study on architecture enhancements to support Proximity Services (ProSe) (Release 12)", V0.4.1, Jun. 2013, 85 pages.
(Continued)

*Primary Examiner* — Asghar H Bilgrami
(74) *Attorney, Agent, or Firm* — Kowert, Hood, Munyon, Rankin & Goetzel, P.C.

(57) ABSTRACT

The techniques introduced here provide for network assisted device-to-device communication for peer-to-peer applications. The techniques include registering a user's peer-to-peer application identifier with a peer-to-peer application server, registering a peer-to-peer application with a device-to-device server, sending a peer-to-peer service request to the peer-to-peer application server, and receiving network assistance in discovering a peer with the desired P2P content/service and establishing a device-to-device communication arrangement for exchange of peer-to-peer services.

25 Claims, 7 Drawing Sheets

Related U.S. Application Data

(60) Provisional application No. 61/752,386, filed on Jan. 14, 2013, provisional application No. 61/721,436, filed on Nov. 1, 2012.

(51) Int. Cl.
*H04W 48/16* (2009.01)
*H04W 8/22* (2009.01)
*H04W 48/04* (2009.01)

(56) References Cited

U.S. PATENT DOCUMENTS

| | | | |
|---|---|---|---|
| 9,549,428 B2 | 1/2017 | Xu | |
| 2007/0298793 A1 | 12/2007 | Dawson | |
| 2009/0168787 A1* | 7/2009 | Ansari | H04L 12/66 370/401 |
| 2009/0213760 A1 | 8/2009 | Shin et al. | |
| 2010/0161755 A1 | 6/2010 | Li et al. | |
| 2011/0244886 A1* | 10/2011 | Yan | H04W 60/00 455/456.1 |
| 2011/0258313 A1 | 10/2011 | Mallik et al. | |
| 2012/0011247 A1* | 1/2012 | Mallik | H04W 8/005 709/224 |
| 2012/0157121 A1* | 6/2012 | Li | G01S 5/0018 455/456.2 |
| 2012/0243437 A1 | 9/2012 | Horn et al. | |
| 2012/0252498 A1 | 10/2012 | Trinchero et al. | |
| 2012/0269072 A1 | 10/2012 | Wu et al. | |
| 2013/0059604 A1 | 3/2013 | Zhu | |
| 2013/0150051 A1 | 6/2013 | Van Phan et al. | |
| 2013/0287012 A1* | 10/2013 | Pragada | H04W 76/25 370/338 |
| 2013/0288668 A1* | 10/2013 | Pragada | H04W 12/06 455/426.1 |
| 2013/0316727 A1 | 11/2013 | Edge et al. | |
| 2014/0010108 A1* | 1/2014 | Tavildar | H04W 8/005 370/254 |
| 2014/0022999 A1* | 1/2014 | Stephens | H04W 12/06 370/329 |
| 2014/0029471 A1 | 1/2014 | Tavildar et al. | |
| 2014/0031028 A1 | 1/2014 | Yamada et al. | |
| 2014/0066018 A1 | 3/2014 | Zhu | |
| 2014/0092885 A1 | 4/2014 | Venkatachalam et al. | |
| 2014/0213306 A1 | 7/2014 | Blankenship et al. | |
| 2014/0335791 A1* | 11/2014 | Kim | H04W 4/023 455/41.2 |
| 2014/0378123 A1 | 12/2014 | Stojanovski et al. | |
| 2015/0063095 A1* | 3/2015 | Deng | H04W 76/18 370/221 |
| 2015/0142986 A1* | 5/2015 | Reznik | H04L 67/16 709/228 |
| 2015/0181375 A1 | 6/2015 | Annamalai | |
| 2016/0057793 A1 | 2/2016 | Wang et al. | |
| 2016/0073322 A1 | 3/2016 | Gao et al. | |
| 2016/0157056 A1 | 6/2016 | Kim et al. | |
| 2017/0111781 A1 | 4/2017 | Zhu et al. | |

FOREIGN PATENT DOCUMENTS

| | | |
|---|---|---|
| CN | 103179575 A | 6/2013 |
| KR | 1020130064217 | 6/2013 |
| TW | 201318382 A | 5/2013 |
| WO | 2005069670 A1 | 7/2005 |
| WO | 2011112683 A1 | 9/2011 |
| WO | 2012091418 A2 | 7/2012 |
| WO | 2012115616 A1 | 8/2012 |
| WO | 2014210250 A1 | 12/2014 |

OTHER PUBLICATIONS

Intel, 111, Sony, "Solution for EPC Support forWLAN direct communication", S2-131696, SA WG2 Meeting #S2-97, Busan, South Korea, Agenda Item 6.4, May 27-31, 2013, 13 pages.

Intel, 111, Sony, Radisys, "Solution for EPC-level ProSe Discovery", S2-131393 (revision of S2-131141), SA WG2 Meeting #96, San Diego, CA, USA, Agenda Item 7.4, Apr. 8-12, 2013, 109 pages.

Intel, "Operator Managed and Operator Assisted D2D", S1-120063, 3GPP TSG-SA WG1 Meeting #57, Kyoto, Japan, Agenda Item 9.7 FS_ProSe, Feb. 13-17, 2012, 4 pages.

U.S. Appl. No. 14/783,573, Non-Final Office Action, dated Jul. 3, 2019, 25 pages.

U.S. Appl. No. 14/783,573, Non-Final Office Action, dated Jan. 8, 2019, 19 pages.

U.S. Appl. No. 14/783,573, Non-Final Office Action, dated Apr. 19, 2018, 23 pages.

U.S. Appl. No. 14/783,573, Final Office Action, dated Sep. 21, 2017, 22 pages.

U.S. Appl. No. 14/783,573, Non-Final Office Action, dated May 4, 2017, 21 pages.

International Search Report and Written Opinion for PCT Patent Application No. PCT/US2013/064865, dated Mar. 11, 2014, 11 pages.

International Preliminary Report on Patentability for PCT Patent Application No. PCT/US2013/064865, dated, May 5, 2015, 7 pages.

Extended European Search Report for European Patent Application No. 13851402.1, dated Jul. 16, 2012, 10 pages.

* cited by examiner

NETWORK ASSISTED DEVICE-TO-DEVICE DISCOVERY FOR PEER-TO-PEER APPLICATIONS

RELATED APPLICATIONS

This application claims priority benefit of U.S. Provisional Patent Application No. 61/721,436, filed Nov. 1, 2012 which is hereby incorporated by reference herein in its entirety.

TECHNICAL FIELD

The present application relates to a device-to-device communication arrangement for peer-to-peer applications and more particularly to network assisted device discovery in the device-to-device communication arrangement.

BACKGROUND ART

Typically, device-to-device (D2D) communications begin with a discovery process between the devices. Unlike standard access point (AP) or base station (BS) discovery where a device will connect to any AP/BS within proximity, in D2D communications a device is looking for a specific device or type of device (e.g. one with the desired service/content). The device discovery process often represents an enormous waste of resources, since it can take long periods of time before the specific device or type of device is within range for D2D communication.

DESCRIPTION OF THE EMBODIMENTS

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

As introduced above, significant resources may be wasted in a D2D discovery process. In various embodiments, network elements can help in significantly reducing resource waste for a device during the D2D discovery process. For example, the network may monitor devices within the network and notify a device when a selected device or type of device is within range for D2D communication. The network may also notify the selected device that another device would like to connect, so that both devices are performing discovery at the same time.

To facilitate network assistance in device discovery, the techniques introduced herein provide for identifying users on an application level and/or user devices a D2D radio access technology [RAT] level. The techniques introduced herein further provide several schemes for D2D discovery and communication for peer-to-peer (P2P) applications.

Figure 1:
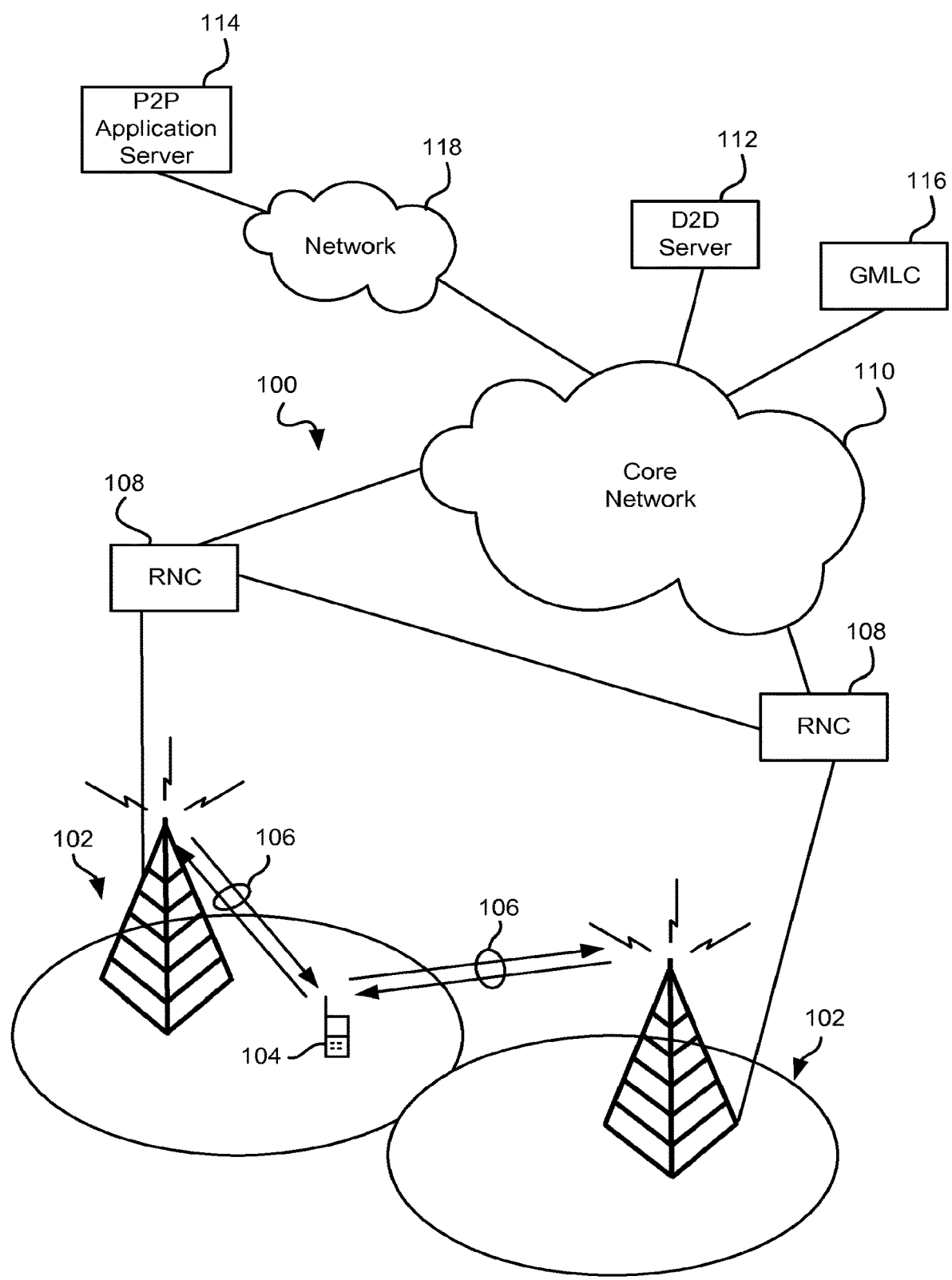
FIG. 1 illustrates an example architecture of a cellular network.

FIG. 1 illustrates an example architecture of a cellular network 100. The example network includes base stations 102 and a mobile terminal 104 (also referred to herein as user equipment (UE)). The term "base station" as used herein is a generic term. As will be appreciated by those skilled in the art, in an Evolved Universal Terrestrial Radio Access Network (EUTRAN), such as one used in the LTE architecture, the base station 102 may be an evolved NodeB (eNodeB). However, the term "eNodeB" is also broader in some senses than the conventional base station since the eNodeB refers, in general, to a logical node. The term "base station" as used herein is inclusive of a base station, a NodeB, an eNodeB or other nodes specific for other architectures.

The UE 104 may use a dedicated channel 106 to communicate with the base station 102. The base station 102 may be connected to a corresponding radio network controller (RNC) 108. Although not shown as such in FIG. 1, it will be appreciated that each RNC 108 may control more than one base station 102. The RNC 108 is connected to a core network 110. In the LTE architecture, the core network 110 is an evolved packet core (EPC).

In various embodiments, the core network 110 may be connected to a D2D server 112 and a Gateway Mobile Location Center (GMLC) 116. Additionally, in some embodiments, a P2P application server 114 may be coupled with cellular network 100 via a network 118 (e.g., the Internet). The D2D server 112 may be configured to facilitate network assisted D2D device discovery as described below. The P2P application server may be configured to provide P2P content and/or P2P service information. The GMLC may be configured to provide location information for peer UEs configured for D2D communication. While the servers 112 and 114 and the GMLC are depicted as distinct entities, it should be understood that one or more of these may be hosted on the same physical server and or be embodied as a single server that provides multiple services.

Figure 2:
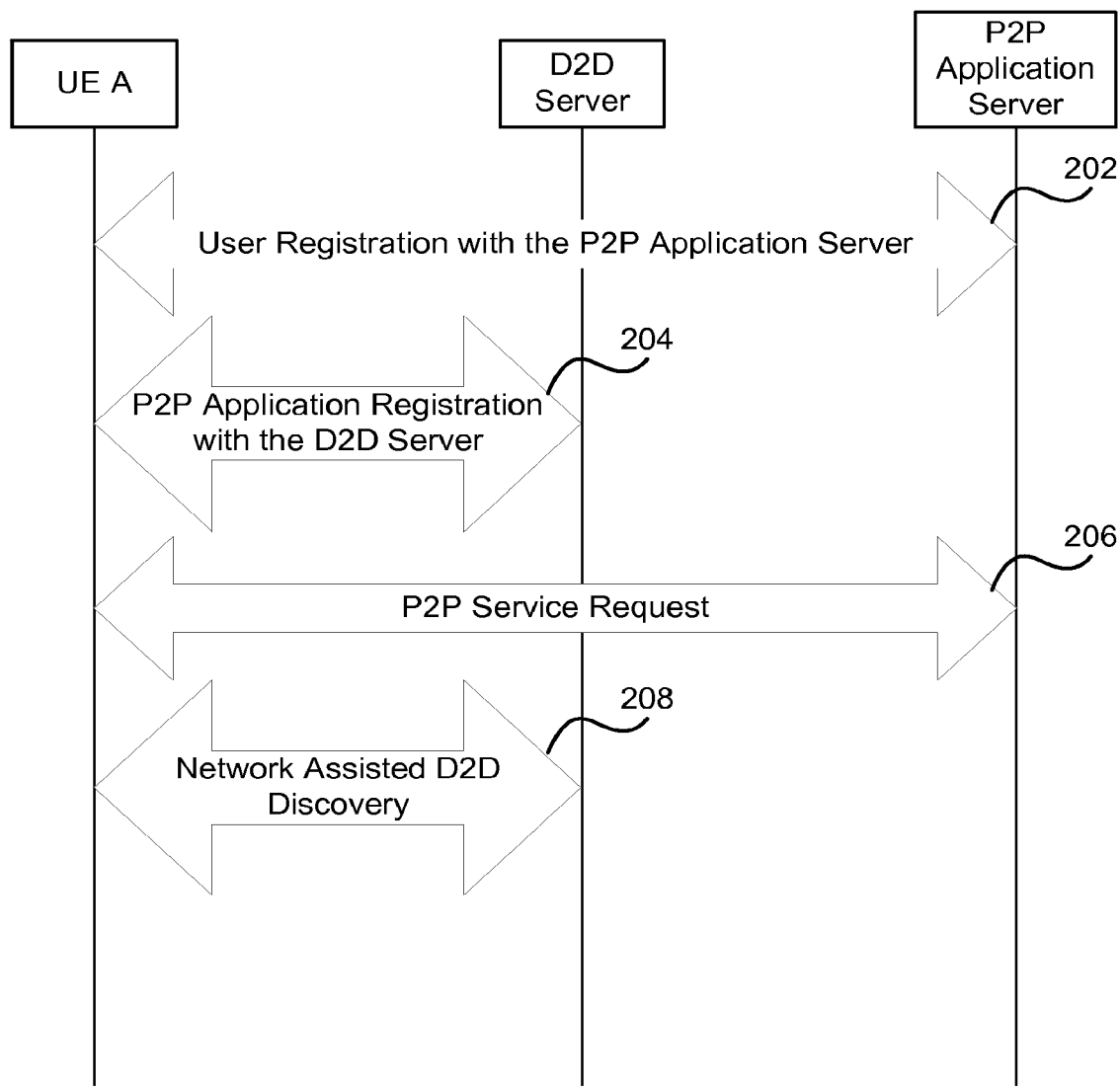
FIG. 2 illustrates an example process for network assisted D2D communication for P2P applications.

FIG. 2 illustrates an example process for network assisted D2D communication for P2P applications. In some embodiments, a user is able to access a P2P application server, such as P2P application server 116, to access P2P content and/or service information. In such embodiments, at 202, a user (using UE A) may register with a P2P application server or servers whose P2P services and or content information the user is interested in.

At 204, the user may register a P2P application with a D2D server. For example, the user may provide the D2D server with a P2P application ID and associated application specific D2D settings (e.g., discovery permissions) for every P2P application the user wants to use in a D2D communication arrangement. In one embodiment, the D2D server maintains a record of the user's registered P2P application IDs associated with a permanent device identifier of the user's UE (e.g., an International Mobile Subscriber Identity (MSI)).

At 206, the user may request P2P service from the P2P application server. In some embodiments, the user may indicate preferred sources of P2P content, a preferred connectivity method (e.g., a D2D communication arrangement, etc.), or the like. In response to the request, the P2P application server may return a list of peer UEs configured to provide the requested P2P service. In some embodiments, the list of peer UEs may be filtered according preferences provided by the user.

At 208, the user may request network assisted D2D discovery. In one embodiment, the user may select a UE from the list of peer UEs with which to connect and receive the P2P services. The D2D server may, in response to the request, assist the UEs in establishing a D2D connection.

The example of FIG. 2 is described in more detail below.

Figure 3:
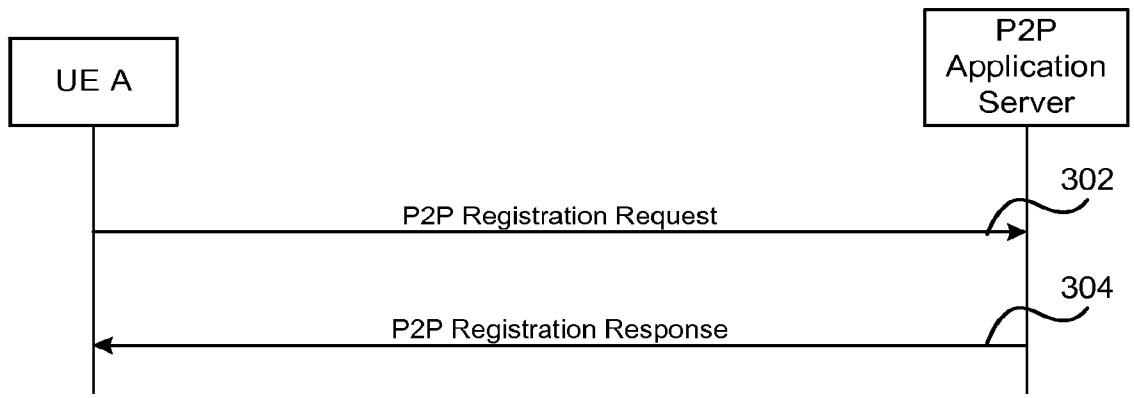
FIG. 3 illustrates an example signaling diagram for user registration with a P2P application server.

FIG. 3 illustrates an example signaling diagram for user registration with a P2P application server. At 302, a user, perhaps using UE A or using a separate computing device, may send a P2P registration request to the P2P application server. In various embodiments, the P2P registration request may include a user's P2P application ID, a list of P2P application specific services and/or content the user is willing to share and permissions associated with the services and/or content (e.g. what peers can access the content/service), and a D2D server identifier. In one embodiment, the P2P registration request may be manually sent by a user or partially or fully automated by a P2P application running on UE A. In some embodiments, after the user has initially registered with the P2P server the user may later log in to the P2P server and update this information.

At 304, the P2P application server may provide a P2P registration response. For example, the P2P application server may indicate whether the registration was successful.

Figure 4:
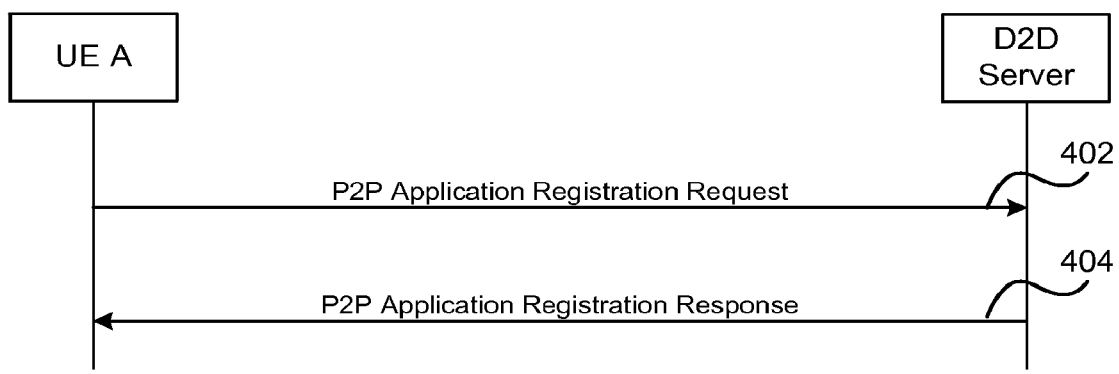
FIG. 4 illustrates an example signaling diagram for P2P application registration with a D2D server.

FIG. 4 illustrates an example signaling diagram for P2P application registration with a D2D server. In some embodiments, a UE (e.g., UE A) that is subscribed to a network operator's network assisted D2D service may be automatically registered with a D2D server during network registration. During this initial registration, the D2D server may store the D2D capabilities (e.g., WiFi Direct, Bluetooth, LTE-Advanced, or the like), D2D permissions (e.g., open or closed discovery, buddy lists, etc.), and/or a permanent device identifier (e.g., IMSI) for the UE. Initially, P2P application specific information may not be registered with the D2D server.

When a user decides to enable a P2P application to use network assisted D2D communication, at 402, the UE may send a P2P application registration request to the D2D server. The P2P application registration request may include, for example, a P2P application ID, a device ID, and/or any specific D2D permissions. For example, there are generally two types of UEs in D2D communication, open and restricted. A UE that has open access will let any UE discover and connect to it. A UE that has restricted access will provide a list of the UEs or types of UEs that can access it. In various embodiments, the D2D server may associate the UE type with the P2P application ID of a user or a device ID of a UE. In various embodiments, the P2P application request may be sent manually by the user, automatically by the P2P application, or a combination of both.

At 404, the D2D server may provide a P2P application registration response. For example, the D2D server may indicate whether the P2P application registration was successful.

Figure 5:
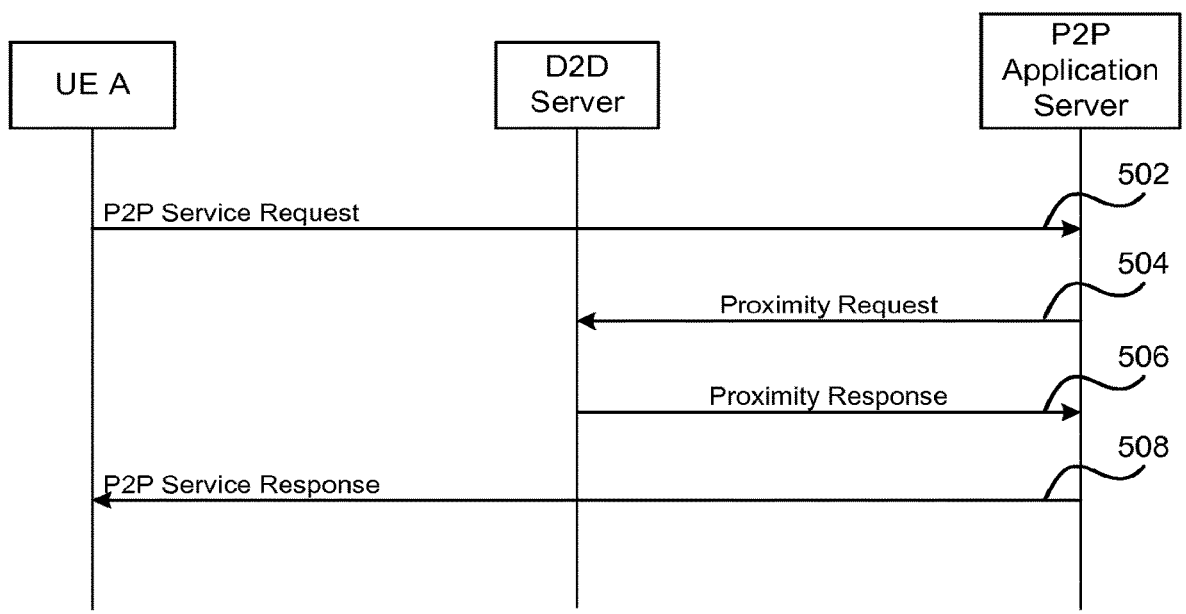
FIG. 5 illustrates an example signaling diagram for a P2P service request where a P2P application server and a D2D server are configured to communicate.

In some embodiments, the P2P application server and the D2D server may be configured to communicate to facilitate the network assisted D2D communication. FIG. 5 illustrates an example signaling diagram for a P2P service request where a P2P application server and a D2D server are configured to communicate.

At 502, UE A transmits a P2P service request to the P2P application server (e.g., in response to a user accessing a P2P application on UE A). The P2P service request may include, for example, an indication of a subset of users (e.g., a buddy list) from whom the user wants to retrieve content or with whom the user wants to engage in a P2P service (e.g., gaming, file sharing, instant messaging, chat, content streaming, etc.). The P2P service request may also include a desired P2P connection arrangement (e.g., D2D, infrastructure, etc.).

In response to the P2P service request, the P2P application server may create a list of potential peer UEs that meet the specifications of the user's request and are willing to share P2P content and/or services with the user. At 504, if D2D is a potential communication mechanism for the peers, the P2P application server sends a proximity request to the D2D server. In an example embodiment, the proximity request may include the user's P2P application ID and the P2P IDs of the potential peer users. Additionally, the proximity request may include a D2D server identifier for D2D servers associated with the potential peer UEs if they are different from the user's D2D server.

In response to the proximity request, the D2D server checks the D2D capabilities and locations of the potential peer UEs. In one embodiment, the D2D server may contact various other D2D servers associated with the potential peer UEs. At 506, the D2D server may then send a proximity response to the P2P application server. The proximity response may include, for example, the P2P application IDs of potential peer UEs that share a common D2D technology with UE A and are within a defined proximity (e.g., an estimated D2D communication range based on D2D technology) of UE A.

At 508, the P2P server may provide a P2P service response to the user, (e.g., via UE A). In various embodiments, the P2P service response may include a list of the potential peer users (e.g., identified by a P2P application ID). In one embodiment, the list may be filtered, organized, or labeled with additional search filters provided by the user (e.g., buddy lists, P2P connection methods, etc.).

Figure 6:
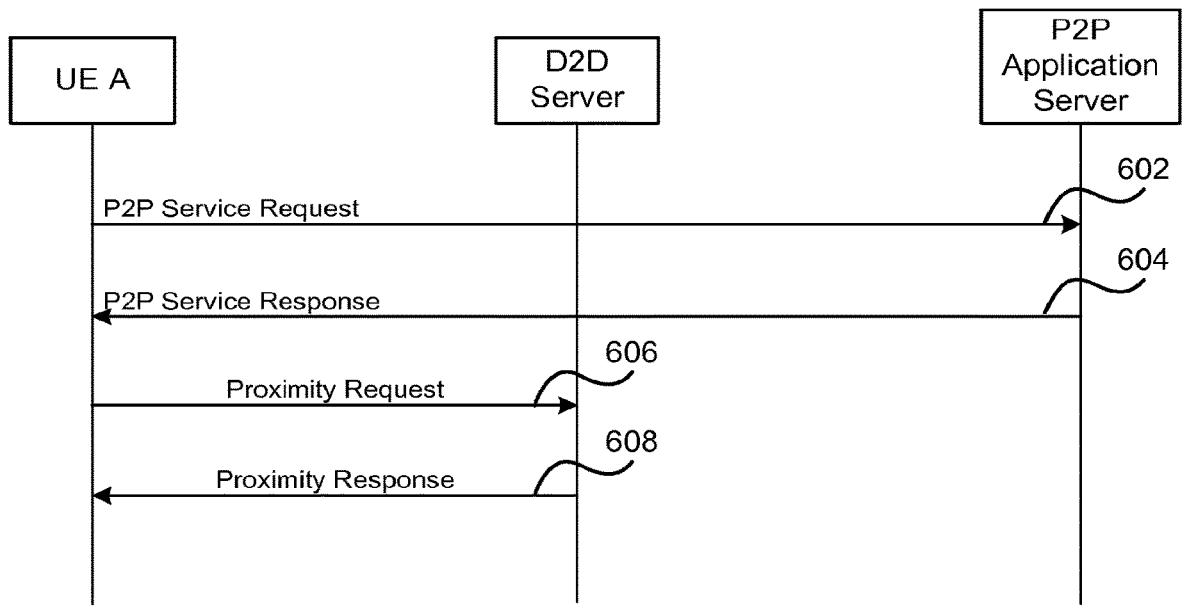
FIG. 6 illustrates an example signaling diagram for a P2P service request where a P2P application server and a D2D server are not configured to communicate.

FIG. 6 illustrates an example signaling diagram for a P2P service request where a P2P application server and a D2D server are not configured to communicate.

At 602, UE A transmits a P2P service request to the P2P application server (e.g., in response to a user accessing a P2P application on UE A). The P2P service request may include, for example, an indication of a subset of users (e.g., a buddy list) with whom the user wants to engage in P2P services. The P2P service request may also include a desired P2P connection arrangement (e.g., D2D, infrastructure, etc.).

At 604, the P2P server may provide a P2P service response to UE A. In various embodiments, the P2P service response may include a list of the potential peer users (e.g., identified by a P2P application ID). In one embodiment, the list may be filtered, organized, or labeled with additional search filters provided by the user (e.g., buddy lists, P2P connection methods, etc.).

At 606, if there are D2D capable peer UEs in the list provided by the P2P server, the UE may send a proximity request to the D2D server. The proximity request may include a P2P application ID associated with each D2D capable peer UE and, in some embodiments, a D2D server associated with each D2D capable peer UE.

At 608, in response to the proximity request, the D2D server may return a subset of the D2D capable peer UEs that share a common D2D technology with UE A and are within a defined proximity. After receiving the list of potential peer UEs, the user may select one or more of the potential peer UEs with which to connect in a D2D communication arrangement.

Figure 7:
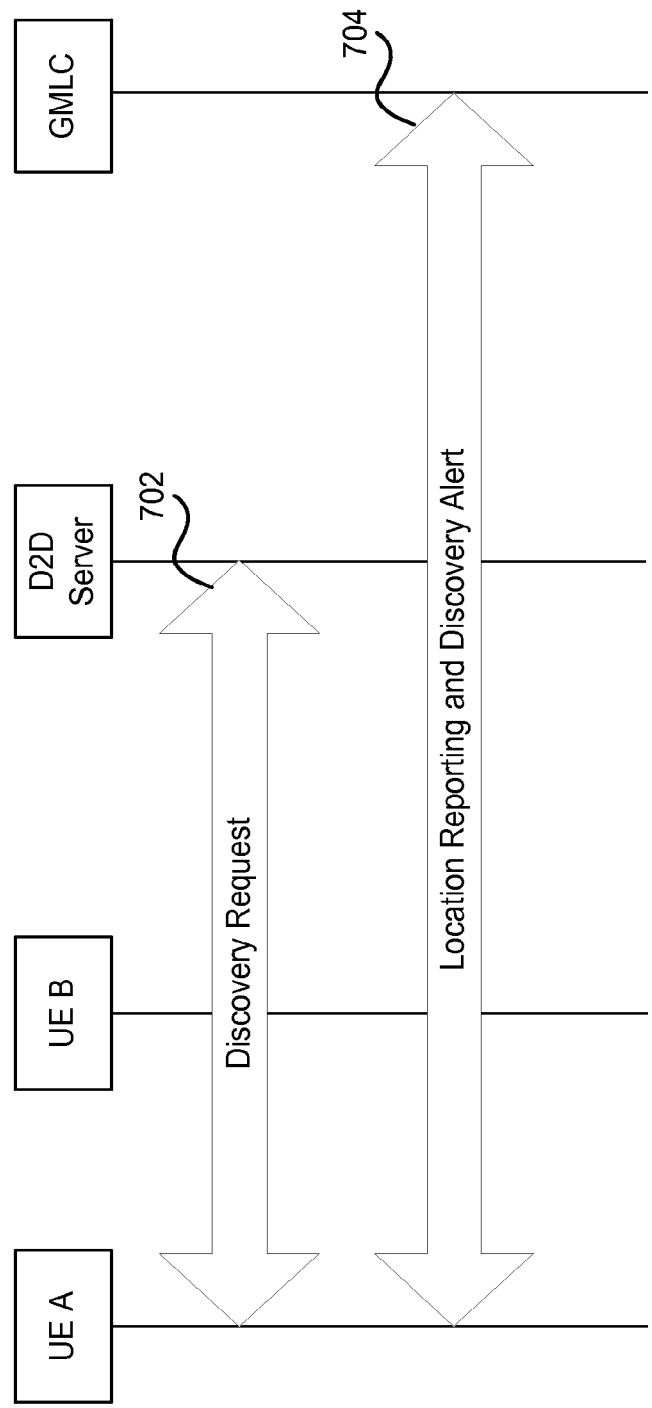
FIG. 7 illustrates an example process for network assisted D2D discovery involving multiple D2D servers.

FIG. 7 illustrates an example process for network assisted D2D discovery involving multiple D2D servers. At 702, The UE may request help from the D2D server to discover (and potentially connect with) the one or more peer UEs during a given time window. If a peer UE has a different D2D server, the D2D server associated with UE A may request location and D2D permission information from the D2D server associated with the peer UE.

At 704, the D2D server associated with UE A and one or more peer UEs may request periodic location reporting for UE A and the one or more peer UEs from a GMLC. In one embodiment, if a peer UE is associated with a different D2D server, the location request may be sent from that server to a GMLC. The D2D server may determine, from the location of UE A and the one or more peer UEs, whether the UEs are in proximity for D2D communication. In response to determining the UEs are within proximity, the D2D server may alert UE A and/or the one or more peer UEs. Similar to the location request, if a peer UE is associated with a different D2D server, the proximity alert may be sent from the corresponding D2D server. In one embodiment, if the UE has requested network assistance with D2D connection establishment post discovery, the D2D server may provide assistance as described below.

Figure 8:
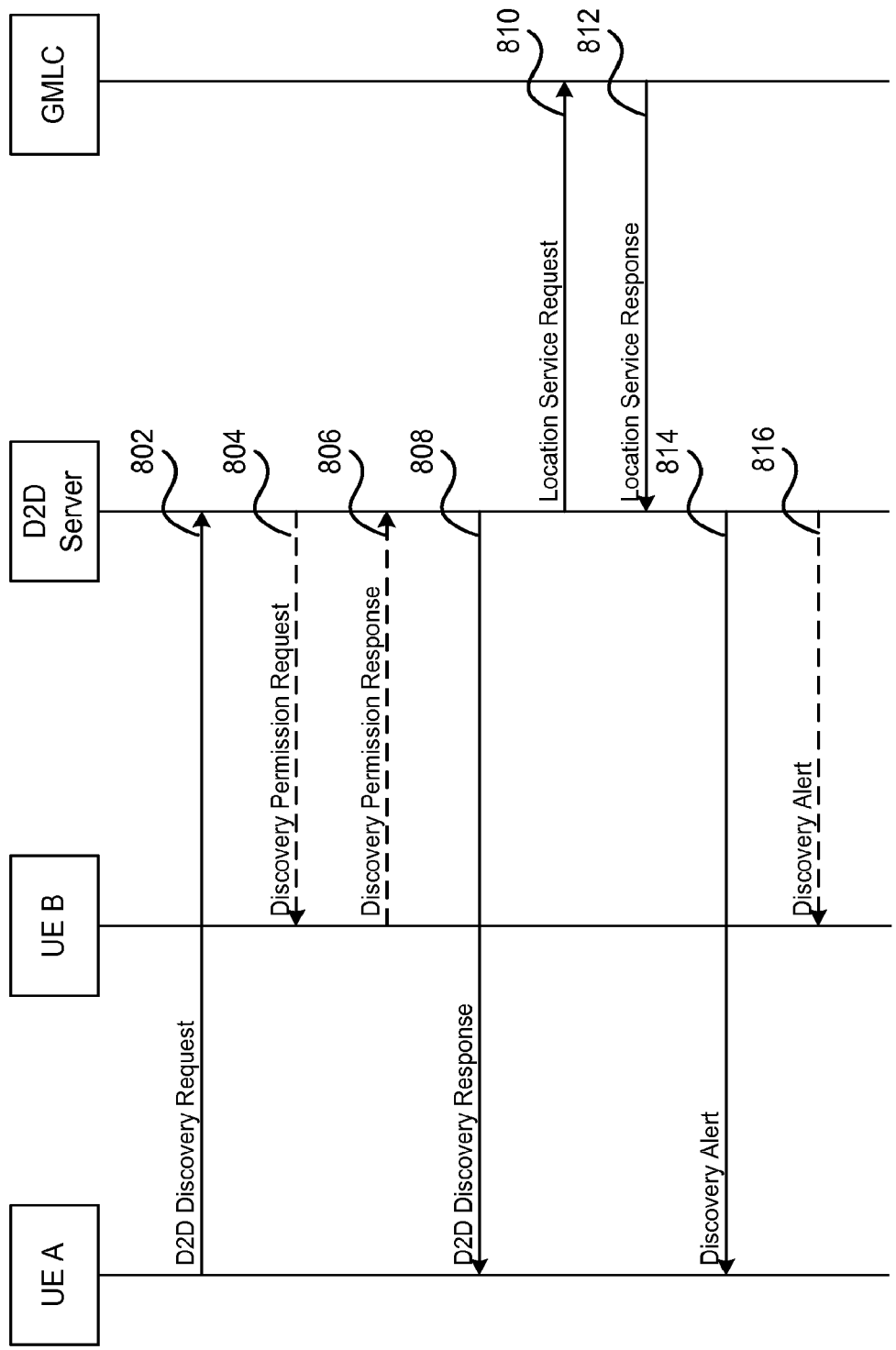
FIG. 8 illustrates an example signaling diagram for network assisted D2D discovery involving a single D2D server.

FIG. 8 illustrates an example signaling diagram for network assisted D2D discovery involving a single D2D server. At 802, UE A may send a D2D discovery request to the D2D server. In some embodiments, the D2D discovery request may include a P2P application ID associated with one or more peer UEs. It should be noted that a UE may request help discovering multiple peer UEs in the same message. The D2D discovery request may also include an indication that the UE wishes to engage in D2D communication after being alerted to the proximity of one or more peer UEs.

If UE A does not have permission to discover a peer UE, the D2D server may request permission in real time (at 804) or simply return a rejection notice. The discovery permission request may include, for example, UE A's P2P application ID. At 806, the peer UE may respond with an indication of whether permission is granted and if there is a time limit on the permission.

At 808, the D2D server sends a D2D discovery response to UE A indicating whether UE A has permission to discover any of the one or more requested peer UEs.

At 810, the D2D server may request location service from a GMLC. The location service request may include a permanent identifier associated with UE A (e.g., IMSI), a permanent identifier associated with one or more peer UEs, a time period for discovery, and/or the like.

At 812, the GMLC may provide a location service response including UE A's location and a location of each of the one or more peer UEs. In one embodiment, the GMLC may provide additional location service responses to the D2D server periodically, based on triggers, thresholds, or any time the location of a UE changes.

In one embodiment, if UE A requested only a discovery alert when one or more peer UEs are within a D2D discovery range, the D2D server may send a discovery alert to UE A. The discovery alert may include the application ID for the one or more peer UEs.

In another embodiment, if UE A has requested network assisted D2D connection establishment, the D2D server may send a discovery alert message to each UE to be involved in the D2D communication. In some embodiments, the discovery alert message may include an application ID (for user recognition) and a permanent or temporary link layer ID (for connection establishment) for each of the other UEs to be involved in the D2D communication. For example, the discovery alert message may include UE B's application layer identifier and temporary device identifier, as well as the temporary device identifier for UE A. In one embodiment, the temporary link layer ID may be assigned by the D2D server. The discovery alert message may also contain other assistance information for the D2D connection establishment process such as timing, D2D roles (e.g., in WiFi Direct, one UE is the group owner while other UEs are clients), etc.

In some embodiments, a P2P application may not be associated with, or may not communicate with, a P2P application server. However, the P2P application may nonetheless be capable of network assisted D2D communication.

For each application that a user wants to enable with network-assisted D2D, the UE may register a P2P application ID and application-specific D2D preferences (e.g. discovery permissions) with a D2D server. The D2D server may know the UE's device identifier (e.g., IMSI), and may map the UE's device identifier with the user's P2P application IDs.

The user may request assistance in discovering (and potentially establishing a D2D connection with) a specific user by providing the D2D server with the desired user's P2P application ID and D2D server name (if the desired user has a separate D2D server). If the user/UE has no information about the desired user's D2D capabilities and/or D2D server name, the D2D server may resolve the D2D server name based on the P2P application ID (e.g. by inquiring with all local D2D servers).

If the desired user is available for D2D communication with the requesting user, the D2D server may assist the user in the discovering and potentially connecting directly with the desired user; otherwise, the D2D server may respond with a failure notice.

Figure 9:
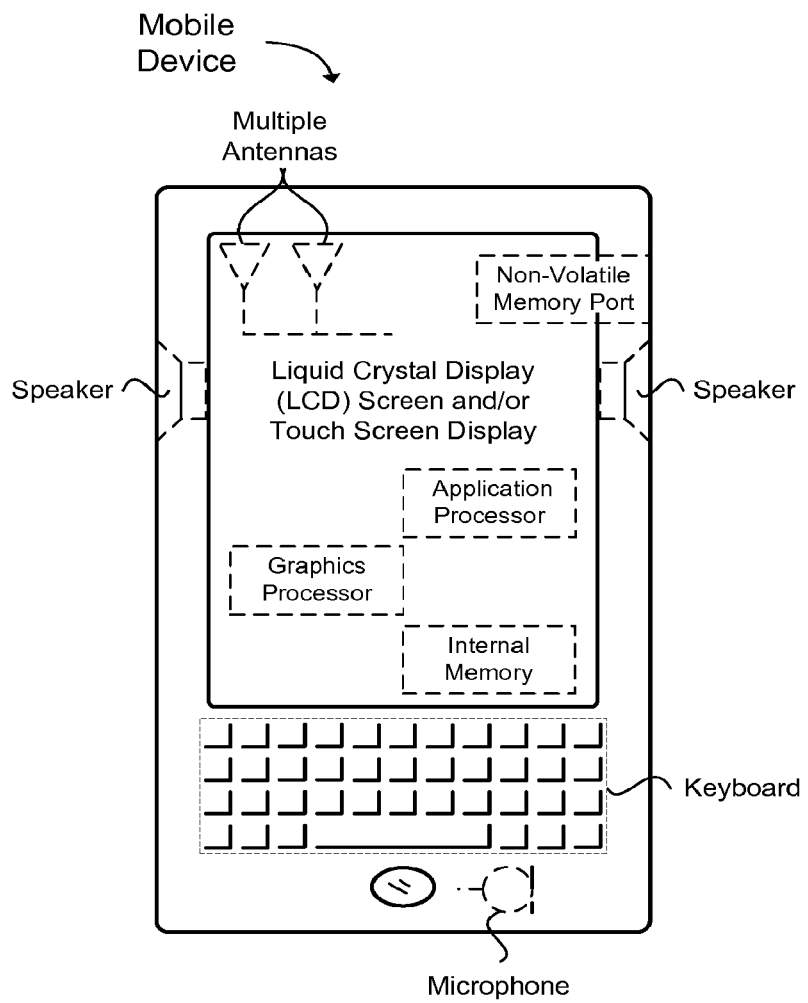
FIG. 9 illustrates an example mobile device.

FIG. 9 illustrates an example mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

The following are example embodiments:

In one embodiment, a UE is configured to use device-to-device communication for peer-to-peer applications. The UE may include a transceiver configured to transmit and receive signals and a processing unit configured to cause the UE to: register with a device-to-device server; receive an indication of one or more device-to-device capable peer UEs from a peer-to-peer application server; transmit a device-to-device discovery request to the device-to-device server for network assistance in discovering a selected UE of the one or more device-to-device capable peer UEs; and receive an alert when the selected UE is within a defined range for discovery.

In an embodiment, the processing unit of the UE may be further configured to cause the UE to: transmit a proximity request to the device-to-device server; and receive an indication of one or more device-to-device capable peer UEs within a defined range.

In an embodiment, in response to a user request to register with the peer-to-peer application server, the processing unit is further configured to cause the UE to transmit a peer-to-peer registration request.

In one embodiment, the peer-to-peer registration request may include at least one of: an application layer identifier for the user; an indication of offered peer-to-peer services, content, or permissions; and/or a device-to-device server name.

In an embodiment, to register with the device-to-device server, the processing unit is further configured to cause the UE to transmit a device-to-device registration request.

In one embodiment, the device-to-device registration request may include at least one of: one or more application layer identifiers for a user associated with the UE; device-to-device permissions; device-to-device capabilities; and/or a device identifier.

In an embodiment, the device-to-device discovery request may include at least one or an application layer identifier for a user associated with the selected UE and a time window for discovery.

In an embodiment, the processing unit of the UE may further be configured to: receive a discovery permission request from the device-to-device server, wherein the discovery permission request may include an application layer identifier for a peer UE requesting a device-to-device connection with the UE; and in response to the discovery permission request, provide a discovery permission response.

In an embodiment, the UE may further comprise one or more of: one or more antennas; a display screen; and/or a physical input key.

In one embodiment, a device-to-device server for assisting in device discovery in a device-to-device communication arrangement for peer-to-peer applications may include a processing unit and a memory coupled with the processing unit, the memory storing instructions, which when executed by the processing unit, cause the device-to-device server to: register a plurality of device-to-device capable peer user equipments (UEs) in response to a registration request from each of the plurality of device-to-device capable peer UEs; receive a device-to-device discovery request from a first UE for network assistance in discovering a second UE; transmit a location service request to a Third Generation Partnership Project (3GPP) Gateway Mobile Location Centre (GMLC); receive a location service response from the GMLC; and transmit to the first UE an alert when the second UE is within a defined range for discovery.

In an embodiment, the registration request from each of the plurality of device-to-device capable peer UEs includes at least one of: an application layer identifier; device-to-device permissions; device-to-device capabilities; and/or a device identifier.

In an embodiment, the instructions stored in the memory may further cause the device-to-device server to provide a list of UEs configured for device-to-device communication in proximity to the first UE in response to a proximity request.

In an embodiment, the proximity request may be received from the first UE.

In an embodiment, the proximity request may be received from a peer-to-peer application server from which the first UE has requested peer-to-peer services.

In an embodiment, the instructions may further cause the device-to-device server to transmit a discovery permission request to the second UE in response to receiving the device-to-device discovery request.

In an embodiment, the device-to-device discovery request may include an application layer identifier for the second UE and a time window for discovery.

In an embodiment, the location service request may include a device identifier for the first UE and the second UE.

In an embodiment, the device identifier may comprise an International Mobile Subscriber Identity (IMSI).

In an embodiment, the instructions may further cause the device-to-device server to transmit an alert to the second UE when the first UE is within a defined range for discovery.

In one embodiment, a non-transitory computer readable storage medium may store instructions, which when executed by a processor, cause the processor to perform a method for network assisted discovery of a peer user equipment (UE) in a device-to-device communication arrangement for a peer-to-peer application. The method may comprise: transmitting, by a first UE, a peer-to-peer service request to one or more servers; receiving a peer-to-peer application identifier of at least one device-to-device capable peer UE from the one or more servers; transmitting a request to the one or more servers for network assistance in discovering a selected UE of the at least one device-to-device capable peer UEs; and receiving an alert from the one or mer server when the selected UE is within a defined range for discovery.

In an embodiment, the one or more servers may include a peer-to-peer application server.

In an embodiment, the one or more servers may include a device-to-device server.

In an embodiment, the method may further include registering, with the one or more servers, one or more of: an application layer identifier of the first UE; an indication of peer-to-peer services, content, or permissions offered by the first UE; and/or an indication of a device-to-device server associated with the first UE.

In an embodiment, the method may further include registering, with the one or more servers, one or more of: an application layer identifier of the first UE; device-to-device capabilities of the first UE; and/or a device identifier associated with the first UE.

In an embodiment, the device identifier associated with the first UE comprises an International Mobile Subscriber Identity (IMSI).

In an embodiment, the method may further include: transmitting a proximity request to the one or more servers; and receiving, in response to the proximity request, an indication of one or more device-to-device capable peer UEs within a defined range of the first UE.

In one embodiment, a method for network assisted device discovery in a device-to-device communication arrangement for peer-to-peer applications may comprise: receiving, at a device-to-device server, a device-to-device discovery request form a first user equipment (UE) for network assistance in discovering a selected UE; transmitting a location service request to a Third Generation Partnership Project (3GPP) Gateway Mobile Location Centre (GMLC); receiving a location service response from the GMLC; updating a database of device locations based on the location service response; and transmitting to the first UE an alert when the selected UE is within a defined range for discovery.

In an embodiment, the method may further include receiving, at the device-to-device server, a registration request from each of a plurality of UEs, including the first UE and the selected UE, the registration request comprising at least one of: an application layer identifier; device-to-device permissions; device-to-device capabilities; and/or a device identifier.

In an embodiment, the method may further include: receiving at the device-to-device server, a proximity request from a peer-to-peer server; and in response to the proximity request, providing a list of UEs configure for device-to-device communication in proximity to the first UE.

In an embodiment, the method may further include: in response to receiving the device-to-device discovery request, transmitting a discovery permission request to the selected UE; and receiving a discovery permission response.

In an embodiment, the method may further include: in response to receiving the device-to-device discovery request, transmitting a discovery permission request to a second device-to-device server associated with the selected UE; and receiving a discovery permission response.

In an embodiment, the device-to-device discovery request may include an application layer identifier for the selected UE and a time window for discovery.

In an embodiment, the location service request may include a device identifier for the first UE and the selected UE.

In an embodiment, the network identifier may comprise an International Mobile Subscriber Identity (IMSI).

In an embodiment, the method may further include transmitting to the selected UE an alert when the first UE is within a defined range for discovery.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

What is claimed is:

1. A non-transitory computer readable storage medium having instructions stored thereon, which when executed by a processor of a user equipment (UE), cause the UE to:
register the UE with a proximity services server on a mobile communications network;
provide the proximity services server with an application layer user identifier corresponding to the UE;
transmit a proximity request to the proximity services server on the mobile communications network for network assistance to discover a peer UE, wherein the proximity request comprises a time window for the proximity request, the application layer user identifier corresponding to the UE, and a peer application layer identifier corresponding to the peer UE; and receive a proximity alert from the proximity services server on the mobile communications network, wherein the proximity alert comprises the peer application layer identifier corresponding to the peer UE, a temporary device identifier corresponding to the peer UE, and a temporary identifier corresponding to the UE, wherein the temporary device identifiers are assigned by the proximity services server.

2. The non-transitory computer readable storage medium of claim 1, wherein, to register the UE with the proximity services server on the mobile communications network, the instructions further cause the UE to send, to the proximity services server on the mobile communications network, a link-layer identifier for the UE for direct discovery and communication.

3. The non-transitory computer readable storage medium of claim 1, wherein the instructions further configured cause the UE to periodically report its location to a location platform.

4. The non-transitory computer readable storage medium of claim 1, wherein the instructions further cause the UE to report its location to a location platform based on a reporting threshold.

5. The non-transitory computer readable storage medium of claim 1, wherein the proximity alert comprises assistance information, wherein the instructions further cause the UE to discover the peer UE based on the assistance information.

6. The non-transitory computer readable storage medium of claim 1, wherein the proximity alert comprises assistance information, wherein the assistance information comprises one or more of:
 a permanent link-layer identifier for the peer UE;
 a temporary link-layer identifier for the peer UE; or
 a designated peer-to-peer group owner for direct communications.

7. The non-transitory computer readable storage medium of claim 1, wherein the proximity alert comprises assistance information, wherein the assistance information comprises a wireless local area network (WLAN) device identifier for the peer UE.

8. The non-transitory computer readable storage medium of claim 1, wherein the proximity alert comprises assistance information, wherein the assistance information comprises one or more of:
 a service set identifier (SSID); or
 a selected operating channel.

9. The non-transitory computer readable storage medium of claim 1, wherein the instructions further cause the UE to register an application with the proximity services server and a peer-to-peer application server.

10. An apparatus for use in a user equipment (UE), the apparatus comprising:
 a memory storing software instructions; and
 a processing unit configured execute the software instructions to cause the UE to:
  register the UE with a proximity services server on a mobile communications network;
  provide the proximity services server with an application layer user identifier corresponding to the UE,
  transmit a proximity request to the proximity services server on the mobile communications network for network assistance to discover a peer UE, wherein the proximity request comprises a time window for the proximity request, the application layer user identifier corresponding to the UE, and a peer application layer identifier corresponding to the peer UE; and
  receive a proximity alert from the proximity services server on the mobile communications network, wherein the proximity alert comprises the peer application layer identifier corresponding to the peer UE, a temporary device identifier corresponding to the peer UE, and a temporary identifier corresponding to the UE, wherein the temporary device identifiers are assigned by the proximity services server.

11. The apparatus of claim 10, wherein, to register the UE with the proximity services server on the mobile communications network, the processing unit is configured to cause the UE to send, to the proximity services server on the mobile communications network, a link-layer identifier for the UE for direct discovery and communication.

12. The apparatus of claim 10, wherein the processing unit is further configured to cause the UE to periodically report its location to a location platform.

13. The apparatus of claim 10, wherein the processing unit is further configured to cause the UE report its location to a location platform based on a reporting threshold.

14. The apparatus of claim 10, wherein the proximity alert comprises assistance information, wherein the processing unit is further configured to cause the UE to discover the peer UE based on the assistance information.

15. The apparatus of claim 10, wherein the processing unit is further configured to cause the UE to register an application with the proximity services server and a peer-to-peer application server.

16. A processor comprised in a proximity services server of a mobile communications network, the processor configured to cause the proximity services server to:
 receive a registration request from a first user equipment (UE) on the mobile communications network;
 receive from the first UE an application layer user identifier corresponding to the first UE;
 receive from the first UE a proximity request for network assistance to discover a peer UE, wherein the proximity request comprises a time window for the proximity request, the application layer user identifier corresponding to the first UE, and a peer application layer identifier corresponding to the peer UE; and
 provide to the first UE a proximity alert comprising the peer application layer identifier corresponding to the peer UE, a temporary device identifier corresponding to the peer UE, and a temporary identifier corresponding to the UE, wherein the temporary device identifiers are assigned by the proximity services server.

17. The processor of claim 16, wherein the registration request includes a link-layer identifier for the first UE; for direct discovery and communication.

18. The processor of claim 16, wherein the processor is further configured to cause the proximity services server to periodically receive location information for the first UE and the peer UE from a location platform.

19. The processor of claim 18, wherein the processor is further configured to cause the proximity services server to:
 determine, based on the location information of the first UE and the peer UE, whether the first UE and the peer UE are in proximity for device-to-device (D2D) communication, wherein providing the proximity alert is in response to determining that the first UE and the peer UE are in proximity for D2D communication.

20. The processor of claim 16, wherein the processor is further configured to cause the proximity services server to request location information for the peer UE from a second proximity services server associated with the peer UE.

21. The processor of claim 16, wherein the processor is further configured to cause the proximity services server to transmit to the peer UE, in response to the proximity request, a discovery permission request, requesting permission to notify the first UE of the proximity of the peer UE.

22. The processor of claim 16, wherein the proximity alert comprises assistance information including one or more of:
   a permanent link-layer identifier for the peer UE; or
   a designated peer-to-peer group owner for direct communications.

23. The processor of claim 16, wherein the proximity alert comprises assistance information, wherein the assistance information comprises a wireless local area network (WLAN) device identifier for the peer UE.

24. The processor of claim 16, wherein the proximity alert comprises assistance information, wherein the assistance information comprises one or more of:
   a service set identifier (SSID); or
   a selected operating channel.

25. The processor of claim 16, wherein the processor is further configured to cause the proximity services server to provide to the peer UE a proximity alert comprising the application layer identifier corresponding to the UE, the temporary, device identifier corresponding to the UE, and the temporary identifier corresponding to the peer UE.

* * * * *

UNITED STATES PATENT AND TRADEMARK OFFICE
CERTIFICATE OF CORRECTION

PATENT NO. : 11,736,927 B2
APPLICATION NO. : 16/730262
DATED : August 22, 2023
INVENTOR(S) : Kerstin Johnsson et al.

Page 1 of 1

It is certified that error appears in the above-identified patent and that said Letters Patent is hereby corrected as shown below:

In the Claims

Column 11, Line 59, delete "UE," and insert --UE;--.

Column 12, Line 59, delete "UE," and insert --UE--.

Column 13, Line 24, delete "temporary," and insert --temporary--.

Signed and Sealed this
Twenty-fourth Day of October, 2023

*Katherine Kelly Vidal*

Katherine Kelly Vidal
*Director of the United States Patent and Trademark Office*